US012661904B2

(12) United States Patent
Mellin et al.

(10) Patent No.: US 12,661,904 B2
(45) Date of Patent: Jun. 23, 2026

(54) FLUID RESERVOIR AND ASSOCIATED FLUID CIRCULATION SYSTEM AND METHOD

(71) Applicant: The Boeing Company, Arlington, VA (US)

(72) Inventors: Matthew H. Mellin, Seattle, WA (US); Travis King, Seattle, WA (US); Jesse Castleberry, Seattle, WA (US); Matt Christner, Seattle, WA (US)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 18/503,678

(22) Filed: Nov. 7, 2023

(65) Prior Publication Data

US 2025/0144943 A1 May 8, 2025

(51) Int. Cl.
*B41J 2/19* (2006.01)
*B41J 2/175* (2006.01)
*B41J 2/18* (2006.01)

(52) U.S. Cl.
CPC ................. *B41J 2/19* (2013.01); *B41J 2/175* (2013.01); *B41J 2/18* (2013.01)

(58) Field of Classification Search
CPC ................. B41J 2/19; B41J 2/175; B41J 2/18
See application file for complete search history.

(56) References Cited

U.S. PATENT DOCUMENTS 10,000,065 B1 * 6/2018 Baker .................. B05B 12/085
2017/0320331 A1 11/2017 Alessi
2018/0031008 A1 2/2018 Basurtekar
2018/0361752 A1 12/2018 Baker
2021/0001354 A1 1/2021 Sakata
2021/0362178 A1 11/2021 Mellin et al.

OTHER PUBLICATIONS

Extended European Search Report for EP Patent Application No. 24192691.4 dated Jan. 20, 2025.

* cited by examiner

*Primary Examiner* — Julian D Huffman

(74) *Attorney, Agent, or Firm* — Kunzler Bean & Adamson

(57) ABSTRACT

A fluid reservoir and associated fluid circulation system and method are disclosed. The fluid reservoir is rotatable into any one of various rotational orientations and includes a housing defining an interior chamber that is divided into a working fluid chamber and a gas chamber by a membrane. An inlet port is fluidically coupled with the working fluid chamber to provide working fluid into the working fluid chamber and an outlet port is fluidically coupled with the working fluid chamber to remove working fluid from the working fluid chamber. A bleed channel extends a length along an outer periphery of the working fluid chamber and is fluidically open to the working fluid chamber along the length of the bleed channel. A bleed port is fluidically coupled with only a portion of the bleed channel and bleeds gas out of the working fluid chamber via the bleed channel. The length of the bleed channel is such that at least a portion of the bleed channel is open to an uppermost portion of the working fluid chamber when the housing is in any one of the various rotational orientations.

17 Claims, 9 Drawing Sheets

FLUID RESERVOIR AND ASSOCIATED FLUID CIRCULATION SYSTEM AND METHOD

FIELD

This disclosure relates generally to a fluid reservoir, and more particularly to a fluid reservoir that enables the removal of gas from fluid in the fluid reservoir independent of the orientation of the fluid reservoir.

BACKGROUND

Fluid flow circuits, such as those used in inkjet printing system, typically employ a reservoir or multiple reservoirs for storing and supplying working fluid to a fluid management device. Traditional reservoirs with a free surface can be used to control the pressure levels of the working fluid. However, such traditional reservoirs are not orientation independent because they are unable to remove gas and fail to detect and manage fill levels at some orientations. Some sealed reservoirs may allow the reservoir to be orientation independent. But these conventional sealed reservoirs do not effectively eliminate gas from the system, which can impede their functionality. Additionally, existing solutions are deficient in achieving unlimited volume compliance, where the system can accommodate for changes in the volume of working fluid without significant changes in pressure to the working fluid.

SUMMARY

The subject matter of the present application has been developed in response to the present state of the art, and in particular, in response to the problems of and needs created by, or not yet fully solved by, fluid reservoirs. Generally, the subject matter of the present application has been developed to provide a fluid reservoir that overcomes at least some of the above-discussed shortcomings of prior art techniques.

Disclosed herein is a reservoir of a fluid circulation system. The reservoir includes a housing defining an interior chamber that is selectively rotatable into any one of various rotational orientations. The reservoir also includes a membrane positioned within the housing and separating the interior chamber into a working fluid chamber, containing a portion of working fluid, and a gas chamber, containing a pressurized gas. The membrane is configured to maintain the portion of working fluid in the working fluid chamber at a constant pressure. The reservoir further includes an inlet port fluidically coupled with the working fluid chamber and configured to provide working fluid into the working fluid chamber. The reservoir additionally includes an outlet port fluidically coupled with the working fluid chamber and configured to remove working fluid from the working fluid chamber. The reservoir also includes a bleed channel extending a length along an outer periphery of the working fluid chamber and fluidically open to the working fluid chamber along the length of the bleed channel. The reservoir further includes a bleed port fluidically coupled with only a portion of the bleed channel and configured to bleed gas out of the working fluid chamber via the bleed channel. The length of the bleed channel is such that at least a portion of the bleed channel is open to an uppermost portion of the working fluid chamber when the housing is in any one of the various rotational orientations. The preceding subject matter of this paragraph characterizes example 1 of the present disclosure.

The membrane is configured to be maintained under tension between the working fluid chamber and the gas chamber. The preceding subject matter of this paragraph characterizes example 2 of the present disclosure, wherein example 2 also includes the subject matter according to example 1, above.

The housing is rotatable within an angular range between 0 and 90 degrees. The length of the bleed channel spans no less than twenty-five percent of the outer periphery of the working fluid chamber. The preceding subject matter of this paragraph characterizes example 3 of the present disclosure, wherein example 3 also includes the subject matter according to any of examples 1-2, above.

The housing is rotatable within an angular range between 0 and 180 degrees. The length of the bleed channel spans no less than fifty percent of the outer periphery of the working fluid chamber. The preceding subject matter of this paragraph characterizes example 4 of the present disclosure, wherein example 4 also includes the subject matter according to any of examples 1-3, above.

The housing is rotatable within an angular range between 0 and 270 degrees. The length of the bleed channel spans no less than seventy-five percent of the outer periphery of the working fluid chamber. The preceding subject matter of this paragraph characterizes example 5 of the present disclosure, wherein example 5 also includes the subject matter according to any of examples 1-4, above.

The housing is rotatable within an angular range between 0 and 360 degrees. The length of the bleed channel spans along the entirety of the outer periphery of the working fluid chamber. The preceding subject matter of this paragraph characterizes example 6 of the present disclosure, wherein example 6 also includes the subject matter according to any of examples 1-5, above.

The outer periphery of the working fluid chamber has a circular shape. The bleed channel curves in an arcuate shape along the outer periphery of the working fluid chamber. A radius of curvature of the arcuate shape is equal to a radius of curvature of the circular shape. The preceding subject matter of this paragraph characterizes example 7 of the present disclosure, wherein example 7 also includes the subject matter according to any of examples 1-6, above.

The bleed channel includes a plurality of orifices along the length of the bleed channel. Only the plurality of orifices are fluidically open to the working fluid chamber. The plurality of orifices are sized such that gas is readily bled from the working fluid chamber and working fluid is less readily bleed from the working fluid chamber. The preceding subject matter of this paragraph characterizes example 8 of the present disclosure, wherein example 8 also includes the subject matter according to any of examples 1-7, above.

A bulk port is fluidically coupled with the working fluid chamber and configured to provide working fluid from a bulk reservoir into the working fluid chamber. The preceding subject matter of this paragraph characterizes example 9 of the present disclosure, wherein example 9 also includes the subject matter according to any of examples 1-8, above.

The working fluid comprises ink. The preceding subject matter of this paragraph characterizes example 10 of the present disclosure, wherein example 10 also includes the subject matter according to any of examples 1-9, above.

Also disclosed herein is a fluid circulation system for supplying working fluid to and returning working fluid from a fluid management device. The fluid circulation system includes a supply reservoir including a supply membrane separating a supply working fluid chamber, containing a portion of working fluid, and a supply gas chamber, containing a pressurized gas at a first pressure. The supply reservoir further comprises a supply-bleed port and a supply-bleed channel. The supply-bleed port is fluidically coupled with the supply-bleed channel, which is in fluidic communication with the supply working fluid chamber. The fluid circulation system also includes a return reservoir including a return membrane separating a return working fluid chamber, containing a portion of working fluid, and a return gas chamber, containing a pressurized gas at a second pressure. The return reservoir further includes a return-bleed port and a return-bleed channel. The return-bleed port is fluidically coupled with the return-bleed channel, which is in fluidic communication with the return working fluid chamber. The fluid circulation system further includes a bulk reservoir including a bulk working fluid chamber with a free surface. The supply-bleed channel is configured to bleed gas within the supply working fluid chamber to the bulk reservoir. The return-bleed channel is configured to bleed gas within the return working fluid chamber indirectly to the bulk reservoir, via the supply working fluid chamber. The supply reservoir and the return reservoir are independently and selectively rotatable into any one of various rotational orientations, relative to the bulk reservoir. The supply reservoir is configured to receive a portion of working fluid to the supply working fluid chamber from the return working fluid chamber and further configured to supply a portion of working fluid from the supply working fluid chamber to the fluid management device. The return reservoir is configured to receive a portion of working fluid from the fluid management device into the return working fluid chamber and further configured to supply a portion of working fluid from the return working fluid chamber to the supply working fluid chamber. The preceding subject matter of this paragraph characterizes example 11 of the present disclosure.

The bulk reservoir is configured to provide or remove a portion of working fluid to at least one of the supply working fluid chamber or the return working fluid chamber. The preceding subject matter of this paragraph characterizes example 12 of the present disclosure, wherein example 12 also includes the subject matter according to example 11, above.

The fluid circulation system includes a pump between the return reservoir and the supply reservoir. The pump is configured to pump a portion of working fluid from the return working fluid chamber to the supply working fluid chamber. The preceding subject matter of this paragraph characterizes example 13 of the present disclosure, wherein example 13 also includes the subject matter according to any of examples 11-12, above.

The first pressure of the pressurized gas within the supply gas chamber has a pressure different from the second pressure of the pressurized gas within the return gas chamber. The first pressure is higher than the second pressure. The preceding subject matter of this paragraph characterizes example 14 of the present disclosure, wherein example 14 also includes the subject matter according to any of examples 11-13, above.

The fluid circulation system includes a first pressure valve and a first vacuum and a second pressure valve and a second vacuum. The first pressure of the pressurized gas within the supply gas chamber is maintained at a constant pressure by the first pressure valve and the first vacuum coupled to the supply reservoir. The second pressure of the pressurized gas within the return gas chamber is maintained at a constant pressure by the second pressure valve and the second vacuum coupled to the return reservoir. The preceding subject matter of this paragraph characterizes example 15 of the present disclosure, wherein example 15 also includes the subject matter according to any of examples 11-14, above.

The supply reservoir and the return reservoir have unlimited volume compliance, such that a pressure of the portion of working fluid within the supply working fluid chamber and the pressure of the port of working fluid within the return working fluid chamber, respectively, remains constant irrespective of variations in a volume of the portion of working fluid. The preceding subject matter of this paragraph characterizes example 16 of the present disclosure, wherein example 16 also includes the subject matter according to any of examples 11-15, above.

Each one of the supply reservoir and the return reservoir are independently and rotatably mounted to a six-axis mount. The preceding subject matter of this paragraph characterizes example 17 of the present disclosure, wherein example 17 also includes the subject matter according to any of examples 11-16, above.

Further disclosed herein is a method for removing gas from working fluid within a reservoir. The method includes pressurizing a portion of working fluid within a working fluid chamber of a reservoir by pressurizing a pressurized gas within a gas chamber of the reservoir at a constant pressure. The working fluid chamber and the gas chamber separated by a membrane. The method also includes receiving a portion of working fluid into the working fluid chamber and removing a portion of working fluid from the working fluid chamber. The method further includes selectively rotating the reservoir, relative to a bulk reservoir. The bulk reservoir is in fluidic communication with the working fluid chamber of the reservoir. When the reservoir is selectively rotating, bleeding gas within the working fluid chamber to the bulk reservoir, through a bleed port fluidically coupled to a bleed channel that is in fluidic communication with the working fluid chamber of the reservoir. The preceding subject matter of this paragraph characterizes example 18 of the present disclosure.

The method includes maintaining the pressurized gas within the gas chamber of the reservoir at a constant pressure using a pressure valve and a vacuum. The preceding subject matter of this paragraph characterizes example 19 of the present disclosure, wherein example 19 also includes the subject matter according to example 18, above.

The step of bleeding gas within the working fluid chamber to the bulk reservoir, through the bleed port further comprises indirectly bleeding gas to the bulk reservoir, via a second reservoir coupled to the working fluid chamber and the bulk reservoir. The preceding subject matter of this paragraph characterizes example 20 of the present disclosure, wherein example 20 also includes the subject matter according to any of examples 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to “one example,” “an example,” or similar language means that a particular feature, structure, or characteristic described in connection with the example is included in at least one example of the subject matter of the present disclosure. Appearances of the phrases “in one example,” “in an example,” and similar language throughout this specification may, but do not necessarily, all refer to the same example. Similarly, the use of the term “implementation” means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a reservoir of a fluid circulation system. The following provides some features of at least some examples of the reservoir. The reservoir may, in some examples, be a supply reservoir or a return reservoir for an inkjet printing system. References to an inkjet printing system throughout are solely intended to exemplify one application of the reservoir of the fluid circulation system. The reservoir and associated systems and methods disclosed herein are particularly suited for use in complex, three-dimensional applications, where an orientation of the reservoir, providing or receiving working fluid from a fluid management device of a fluid circulation system, may change during operation. For example, the reservoir can be associated with an inkjet printing system that prints ink on a three-dimensional surface, such as a surface of an aircraft. As the reservoir is selectively moved and rotated about the printing surface, the pressure of a portion of the working fluid within a working fluid chamber is maintained at a constant pressure. Additionally, gas within the portion of working fluid is bled from the working fluid chamber via a bleed channel because at least a portion of the bleed channel is open to an uppermost portion of the working fluid chamber regardless of the orientation of the reservoir. Furthermore, the reservoir can be used in combination with other components of the fluid circulation system to enable pressure-driven incompressible fluid flow through the fluid circulation system with unlimited volume compliance.

Figure 1:
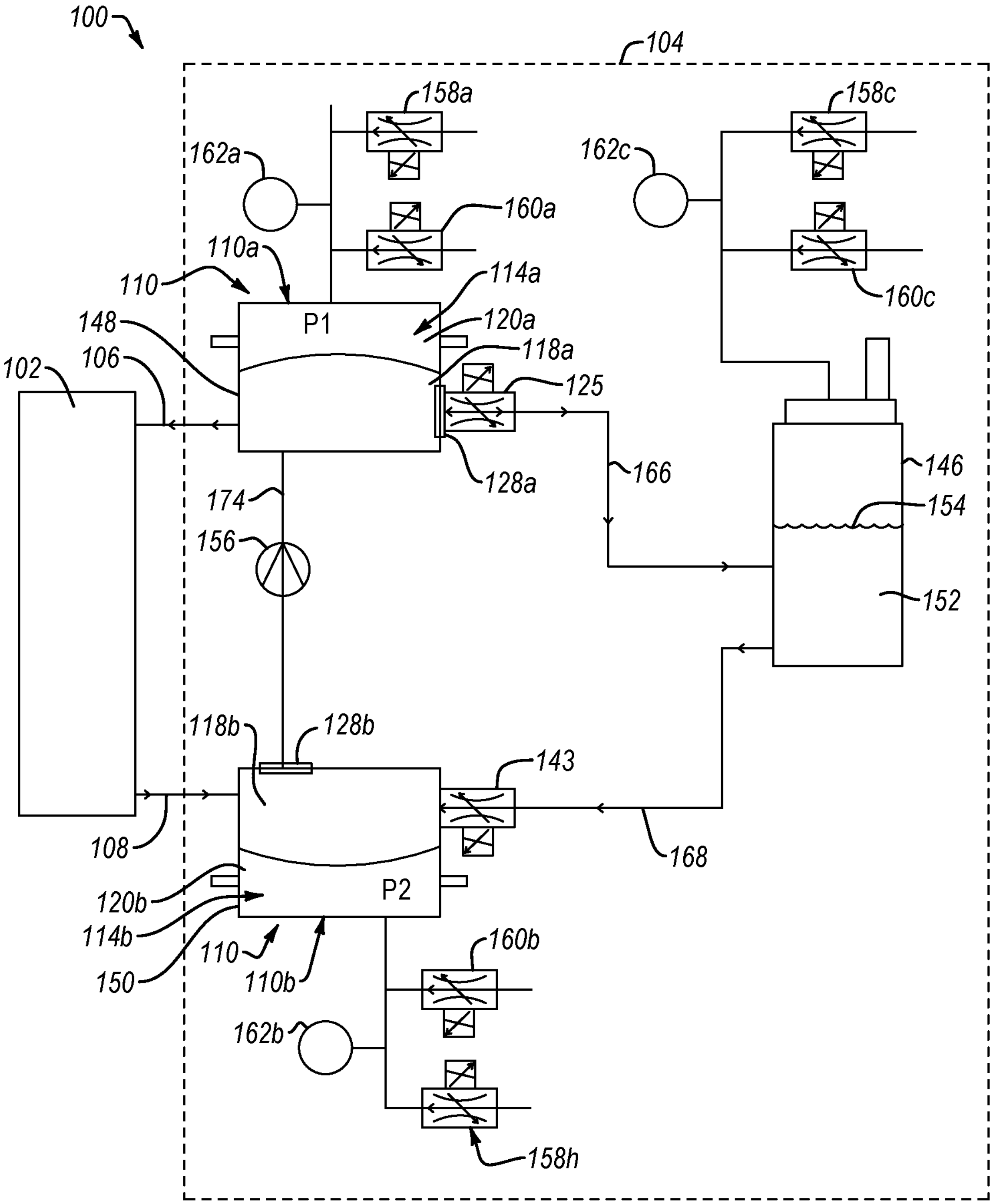
FIG. 1 is a schematic view of a fluid flow circuit of a fluid circulation system, according to one or more examples of the present disclosure.

Referring to FIG. 1, according to one example, a system 100 includes a fluid circulation system 104 that is configured to circulate working fluid to and from a fluid management device 102. Specifically, the fluid circulation system 104 supplies working fluid to the fluid management device 102 and returns working fluid from the fluid management device 102. Accordingly, the fluid circulation system 104 is configured to supply working fluid in a continuous and controlled flow to and from the fluid management device 102. The system 100 includes an inlet line 106, which serves as the entry point of the working fluid into the fluid management device 102 and fluidically couples the fluid circulation system 104 to the fluid management device 102 to supply working fluid from the fluid circulation system 104. Similarly, the system 100 includes an outlet line 108, which serves as the return path of the working fluid, independent of the inlet line 106, and fluidically couples the fluid circulation system 104 to the fluid management device 102 to return the working fluid from the fluid management device 102. The working fluid may be undispensed working fluid that is not dispensed from the fluid management device 102, when the fluid management device 102 is a dispensing device.

The fluid management device 102, in some examples, can be any device configured to dispense working fluid. For example, the fluid management device 102 may be a printhead configured to dispense ink on a surface. Accordingly, the working fluid can be ink that is configured to be printed, such as inkjet printed, on a surface. In some examples, the surface is a complex, three-dimensional surface, such as a surface of an aircraft. Moreover, the fluid management device 102 may include at least one nozzle, through which working fluid is dispensed. As used herein working fluid includes any incompressible fluid, (i.e., fluid that is relatively resistant to changes in volume when subjected to pressure) that is dispensable from the fluid management device 102. For example, working fluid may be water or a water-based fluid, oil or an oil-based fluid, hydraulic fluids, ink, etc.

In other examples, the fluid management device 102 does not dispense working fluid from the fluid management device 102, and therefore does not have a nozzle, but does precisely control the pressure of the working fluid within the fluid management device 102. For example, the fluid management device 102 may be a pressure-based haptic device. That is, a pressure-based haptic device configured to use changes in fluid pressure to control force feedback experienced by a user. Such devices have practical applications in different fields such as robotic-assisted manufacturing, virtual and augmented reality environments, and remote telepresence systems.

The fluid management device 102 is coupled to a structure, not shown, that allows the fluid management device 102 to translationally move in at least one direction (e.g., forward/backward, left/right, or up/down) and rotate in at least one degree of freedom (e.g., about an X, Y, or Z axis, or pitch, yaw, and roll) about the surface. In some examples, the fluid management device 102 is supported by the structure for translation and rotation in six degrees of freedom. The structure can be an industrial multi-axis robotic arm in some examples.

The fluid circulation system 104 of the system 100 includes two reservoirs 110, a first reservoir 110*a* and a second reservoir 110*b*, which are described in more detail below with regards to FIGS. 2-4. In some examples, the first reservoir 110*a* is a supply reservoir 148 that is configured to supply working fluid to the fluid management device 102 and the second reservoir 110*b* is a return reservoir 150 that is configured to store working fluid from the fluid management device 102. The first reservoir 110*a* and the second reservoir 110*b* are both configured to be rotatable into any one of various rotational orientations. In some examples, the first reservoir 110*a* and the second reservoir 110*b* are rotatable in one degree of freedom. In other examples, the first reservoir 110*a* and the second reservoir 110*b* are rotatable in three degrees of freedom. In yet other examples, the first reservoir 110*a* and the 110*b* are translationally movable in any of various directions, as well as rotatable as described above. Moreover, the first reservoir 110*a* and the second reservoir 110*b* may be mounted to an individual and separately actuatable six-axis mounts (e.g., robotic arm), such that the first reservoir 110*a* and the second reservoir 110*b* are independently rotatable. The fluid circulation system 104 also includes a bulk reservoir 146 to which the first reservoir 110*a* and the second reservoir 110*b* are fluidically coupled. Accordingly, the first reservoir 110*a* and the second reservoir 110*b* are independently and selectively rotatable into any one of the various rotational orientations, relative to the bulk reservoir 146, which is rotational fixed such that the bulk reservoir 146 does not rotate. For example, the bulk reservoir 146 can be fixed relative to a floor of a manufacturing site, and the first reservoir 110*a* and the second reservoir 110*b* can be fixed to one or more robotic arms that are movable relative to the floor of the manufacturing site.

The supply reservoir 148 is configured to supply working fluid from within the supply working fluid chamber 118*a*, through the inlet line 106, to the fluid management device 102. Moreover, the supply reservoir 148 is configured to receive additional working fluid to the supply working fluid chamber 118*a* from the return reservoir 150, through the supply-return line 174. The supply reservoir 148 includes a supply membrane 116*a* that acts as a partition, creating two distinct chambers within an interior chamber 114*a* of the supply reservoir 148. A supply working fluid chamber 118*a* contains a portion of working fluid and a supply gas chamber 120*a* contains a pressurized gas at a first pressure P1. Referring to FIG. 3C a cross-sectional view of the supply reservoir 148 shows the supply membrane 116*a* dividing the open cavity of the interior chamber 114*a* of the supply reservoir 148 into the two distinct chambers, the supply gas chamber 120*a* and the supply working fluid chamber 118*a*. The supply reservoir 148 also includes a supply-bleed channel 128*a* in fluidic communication with the supply working fluid chamber 118*a*. The supply-bleed channel 128*a* is configured to bleed gas (e.g., air bubbles) within the supply working fluid chamber 118*a* to the bulk reservoir 146.

The return reservoir 150 is configured to return working fluid from the fluid management device 102, through the outlet line 108, to the return working fluid chamber 118*b*. Moreover, the return reservoir 150 is configured to provide working fluid from the return working fluid chamber 118*b* to the supply working fluid chamber 118*a*, through the supply-return line 174. Accordingly, working fluid is continuously flowing between the supply reservoir 148, the fluid management device 102, and the return reservoir 150, during operation of the system 100. Similar to the supply reservoir 148, the return reservoir 150 includes a return membrane 116*b* that acts as a partition, creating two distinct chambers with an interior chamber 114*b* of the return reservoir 150. A return working fluid chamber 118*b* contains a portion of working fluid and a return gas chamber 120*b* contains a pressurized gas at a second pressure P2. The return reservoir 150 also includes a return-bleed channel 128*b* in fluidic communication with the return working fluid chamber 118*b*. The return-bleed channel 128*b* is configured to bleed gas within the return working fluid chamber 118*b* to the supply reservoir 148.

The pressurized gas within the supply gas chamber 120*a* is maintained at the first pressure P1. The gas within the supply gas chamber 120*a* is pressurized in order to pressurize the portion of working fluid within the supply working fluid chamber 118*a*. In other words, by regulating the pressure of the supply gas chamber 120*a*, the pressure of the supply working fluid chamber 118*a* is also regulated, as thus the pressure of the portion of working fluid is known. Accordingly, in some examples, a first pressure valve 158*a* and a first vacuum 160*a* are coupled to the supply reservoir 148 and configured to maintain the pressured gas within the supply gas chamber 120*a* at the first pressure P1. Likewise, the pressurized gas within the return gas chamber 120*b* is maintained at the second pressure P2. Accordingly, in some examples, a second pressure valve 158*b* and a second vacuum 160*b* are coupled to the return reservoir 150 and configured to maintain the pressured gas within the return gas chamber 120*b* at the second pressure P2. In some examples, the first pressure P1 of the pressurized gas within the supply gas chamber 120*a* has a different pressure from the second pressure P2 of the pressurized gas of the return gas chamber 120*b*. For example, the first pressure P1 may be higher than the second pressure P2. Accordingly, working fluid flowing from the return reservoir 150 to the supply reservoir 148 moves from a lower-pressure chamber to a higher-pressure chamber.

The supply reservoir 148 and the return reservoir 150 have unlimited volume compliance. As used herein unlimited volume compliance means the pressure of the portion of working fluid within a reservoir 110 remains constant irrespective of variations in the volume of the portion of working fluid. This is in contrast to conventional fluid circulation systems where changes in the volume of working fluid results in corresponding changes in the pressure of working fluid. Accordingly, regardless of how much gas is within the gas chamber 120 the pressure of the gas can be maintained using the corresponding pressure valve 158 and vacuum 160. In other words, a volume of the portion of working fluid within the working fluid chamber 118 is independent of (i.e., not linked) to the pressure of the portion of working fluid.

The bulk reservoir 146 includes a bulk working fluid chamber 152 with a free surface 154. As used herein a free surface is a boundary or interface between a fluid, (i.e., a liquid or gas) and the surrounding environment. That is, a free surface 154 exists when a portion of working fluid within the bulk working fluid chamber 152 is not confined or constrained by physical boundaries. In other words, the portion of working fluid within the bulk working fluid chamber 152 can freely change shape, flow, and is affected by external forces, such as gravity. As the bulk reservoir 146 is rotational fixed, the portion of working fluid within the bulk working fluid chamber 152 maintains the free surface 154 during operation of the system 100. A supply-bulk line 166 is fluidically coupled with the supply working fluid chamber 118*a* of the supply reservoir 148 and the bulk working fluid chamber 152. Accordingly, the bulk reservoir 146 allows the system 100 to accommodate for changes in volume within the fluid circulation system 104. The supply-bulk line 166 is configured to remove working fluid from the supply working fluid chamber 118*a* to the bulk working fluid chamber 152. Similarly, a return-bulk line 168 is fluidically coupled with the return working fluid chamber 118*b* of the return reservoir 150 and the bulk working fluid chamber 152. The return-bulk line 168 is configured to provide working fluid to the return working fluid chamber 118*b* from the bulk working fluid chamber 152.

The bulk reservoir 146 is also configured to allow the system 100 to remove gas from within the working fluid chamber 118 of a reservoir 110 to the bulk working fluid chamber 152. That is, any gas within the supply working fluid chamber 118*a* can be removed, via the supply-bulk line 166, to the bulk working fluid chamber 152. Any gas removed to the bulk working fluid chamber 152 migrates to the free surface 154 of the bulk working fluid chamber 152 and is expelled from working fluid that is circulating through the fluid circulation system 104. Moreover, any gas within the return working fluid chamber 118*b* is configured to be indirectly removed to the bulk working fluid chamber 152. That is, any gas within the return working fluid chamber 118*b* can be removed, via the supply-return line 174, and into the supply working fluid chamber 118*a*, which can then be removed, via the supply-bulk line 166 to the bulk working fluid chamber 152. The flow of gas is unidirectional, moving the gas either directly from the supply reservoir 148 to the bulk reservoir 146 or indirectly from the return reservoir 150 to the supply reservoir 148 and further into the bulk reservoir 146.

In some examples, a bulk pressure P3 of the portion of working fluid within the bulk working fluid chamber 152 is regulated by a bulk pressure valve 158*c* and a bulk vacuum 160*c* coupled to the bulk reservoir 146. A bulk pressure sensor 162*c* may be provided for determining actual pressures generated by the bulk pressure valve 158*c* and the bulk vacuum 160*c* by generating a pressure signal indicated of the actual pressure of the portion of working fluid in the bulk working fluid chamber 152. In some examples, the bulk pressure P3 of the bulk reservoir 146 has a different pressure from the first pressure P1 of the pressurized gas of the supply gas chamber 120*a*. In other examples, the bulk pressure P3 of the bulk reservoir 146 has a different pressure from the second pressure P2 of the pressurized gas of the return gas chamber 120*b*. In yet other examples, the bulk pressure P3 of the bulk reservoir is pressurized between the first pressure P1 and the second pressure P2. For example, working fluid flowing from the supply reservoir 148 to the bulk reservoir 146 and further to the return reservoir 150 moves from a higher-pressure chamber, to a mid-pressure chamber, to a lower-pressure chamber. Accordingly, in some examples, the flow of working fluid from the supply reservoir 148 to the bulk reservoir 146 and to the return reservoir 150 is a pressure driven flow, as the working fluid is moving from a higher-pressure chamber to a lower-pressure chamber.

The fluid circulation system 104 may also include a pump 156 between the return reservoir 150 and the supply reservoir 148. The pump 156 is selectively operable to move a portion of working fluid from the return working fluid chamber 118*b* to the supply working fluid chamber 118*a*. Accordingly, the portion of working fluid within the return working fluid chamber 118*b*, which may include undispensed working fluid from the fluid management device 102, is recirculated through the fluid circulation system 104. In other words, the pump 156 is configured to continuous circulate working fluid through the fluid circulation system 104. Moreover, in some examples, the pump 156 may be used to move the working fluid from the lower-pressure return working fluid chamber 118*b* to the higher-pressure supply working fluid chamber 118*a*. That is, the pump 156 is used to transfer the working fluid from the lower-pressure chamber to the higher-pressure chamber by actively counteracting the pressure gradient.

The fluid circulation system 104 may include a controller or plurality of controllers, not shown, operably coupled to the fluid circulation system 104 to at least regulate the pressure of the supply reservoir 148, the return reservoir 150, and the bulk reservoir 146. The controller may be representative of any kind of computing device or controller, or may be a portion of another apparatus as well, such as an apparatus included entirely within a server, and portions of the controller may be elsewhere or located within other computing devices. More specifically, the controller includes a processor that may execute logic stored in data storage to control the operations of the controller. Additionally, proportional valves, such as a proportional valve 125 and a proportional valve 143, may be used throughout the fluid circulation system 104 to regulate the pressure of gas or working fluid entering into the fluid circulation system 104. Proportional valves may also be used to modulate the flow of working fluid entering into the fluid circulation system 104.

Figure 2A:
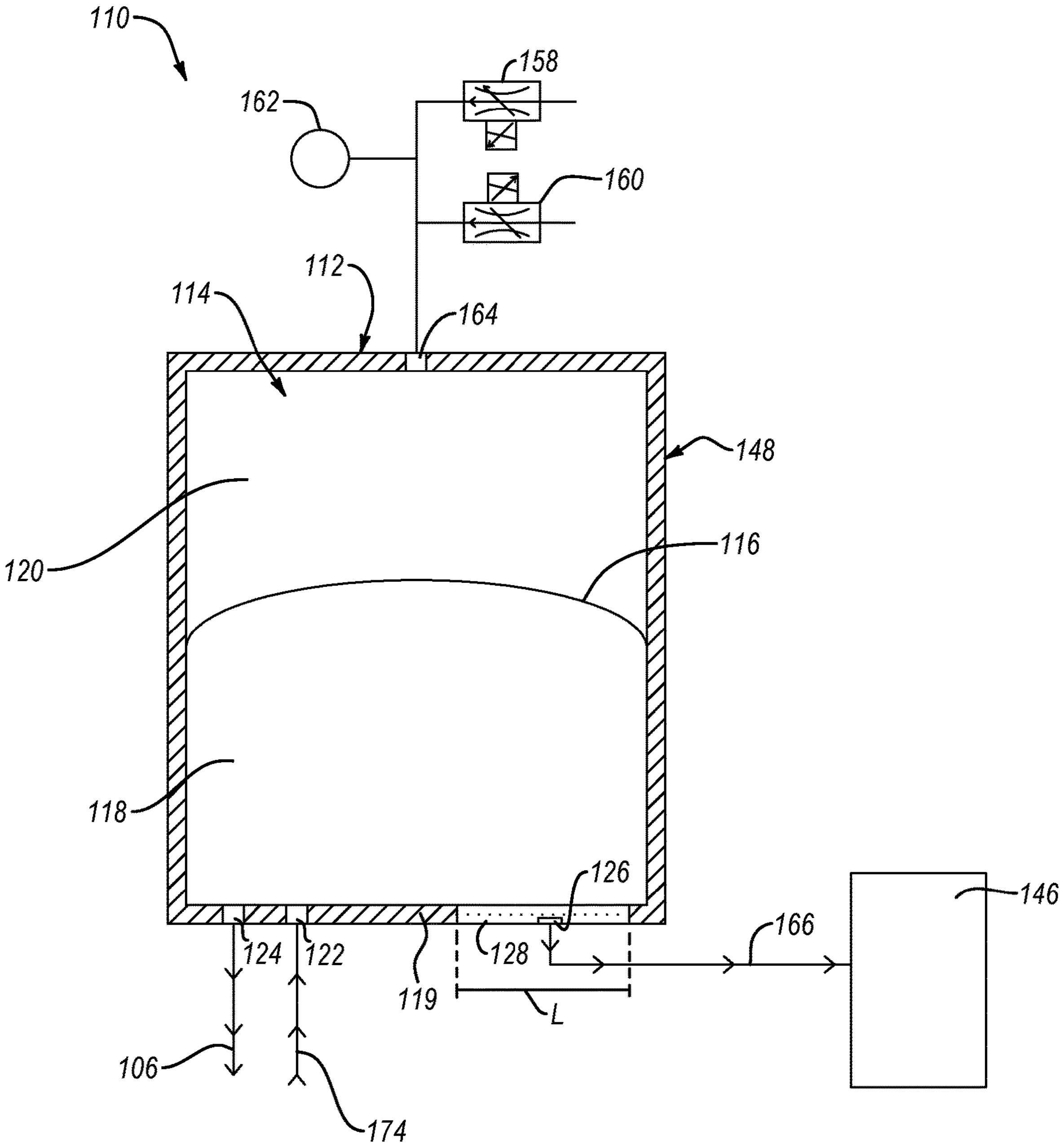
FIG. 2A is a schematic cross-sectional view of a fluid reservoir of a fluid circulation system, according to one or more examples of the present disclosure.
Figure 2B:
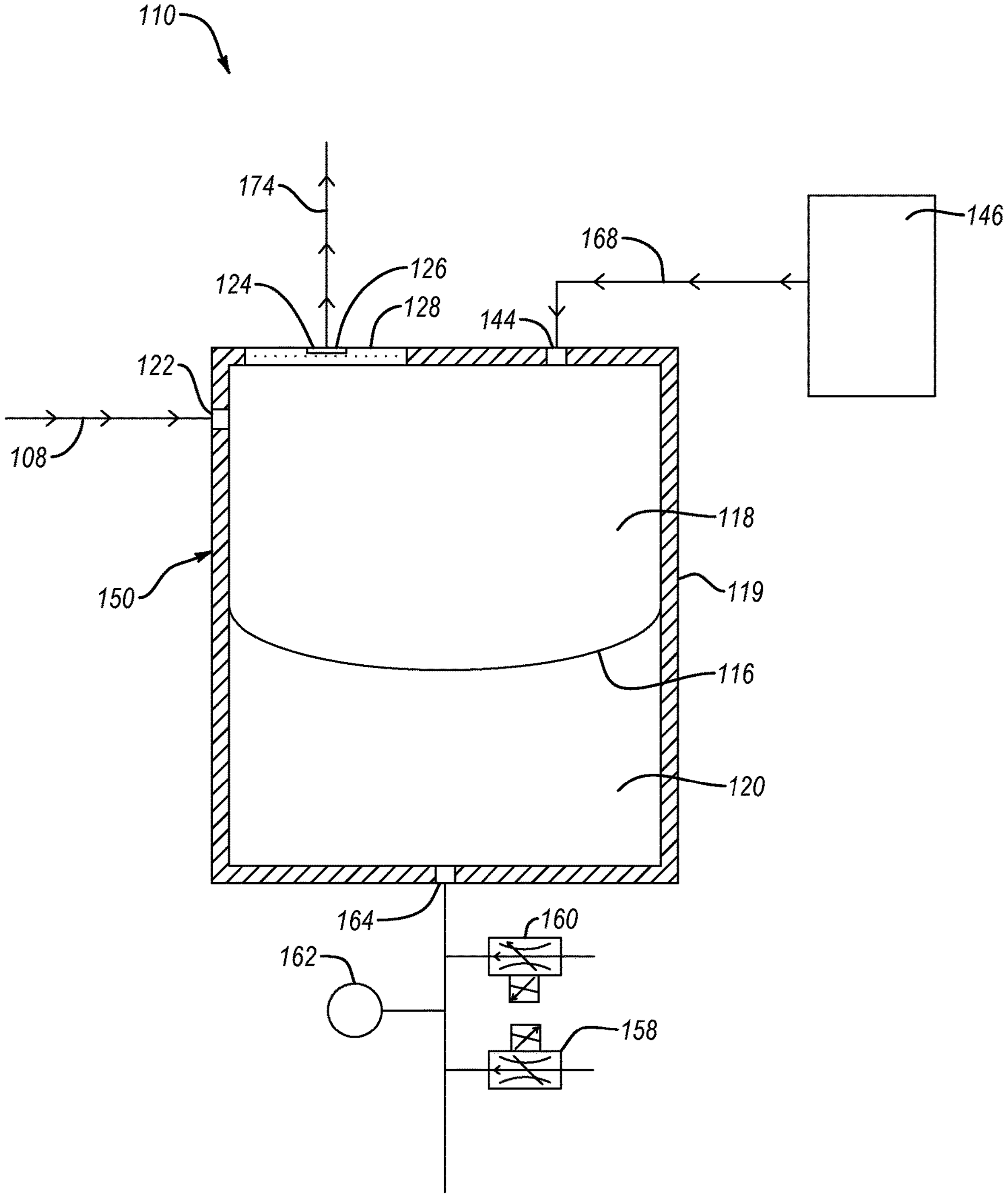
FIG. 2B is a schematic cross-sectional view of another fluid reservoir of a fluid circulation system, according to one or more examples of the present disclosure.

Referring to FIGS. 2A and 2B, some examples of the reservoir 110 are shown. The reservoir may be one of a supply reservoir 148, shown in FIG. 2A or a return reservoir 150, shown in FIG. 2B of a fluid circulation system 104. The reservoir 110 and additional features are depicted for illustrative purposes and may not be drawn to proper scale or proportions. The reservoir 110 includes a housing 112 that defines an interior chamber 114. The housing 112 is selectively rotatable into any one of various rotational orientations. That is, the housing 112 may be mounted to a mount that allows the housing 112 to rotate in at least one degree of freedom. A membrane 116 (i.e., diaphragm) is positioned within the housing 112 and separates the interior chamber 114 into a working fluid chamber 118 and a gas chamber 120. The membrane 116 is made of a material that is flexibly resilient, such that the membrane 116 can respond to changes in pressure and maintain in a taut condition. In other words, the membrane 116 ensures effective separation of the working fluid chamber 118 and the gas chamber 120 while accommodating fluctuations in gas pressure or fluid volume. As the reservoir 110 is pressurized by pressurizing the gas chamber 120, in some examples, the membrane 116 will retain a curved shape, specifically convexly curved outward from the working fluid chamber 118 towards the gas chamber 120. The working fluid chamber 118 contains a portion of working fluid that is flowable through a fluid circulation system 104. The gas chamber 120 contains a pressurized gas that remains confined within the gas chamber 120 for pressure regulation purposes.

The pressurized gas is configured to maintain the portion of working fluid in the working fluid chamber 118 at a constant pressure. Accordingly, in some examples, the pressure of the gas is controlled by a pressure valve 158 and a vacuum 160 coupled to the housing 112. A pressure port 164, extending through the housing 112, fluidically couples the gas chamber 120 to the pressure valve 158 and the vacuum 160. Additionally, a pressure sensor 162 is used to sense the pressure of the pressurized gas. The pressurized gas keeps the membrane 116 under tension, therefore allowing the pressurized gas to pressurize the portion of working fluid within the working fluid chamber 118. That is, by regulating the pressure of the gas within the gas chamber 120, the pressure of the portion of working fluid within the working fluid chamber 118 is also regulated, and thus the pressure of the portion of working fluid is known.

Working fluid is configured to flow into and out of the working fluid chamber 118. Accordingly, the working fluid chamber 118 includes an inlet port 122 that extends through the housing 112 and is fluidically coupled with the working fluid chamber 118. The inlet port 122 is configured to provide working fluid from the fluid circulation system 104 into the working fluid chamber 118. Additionally, the working fluid chamber 118 includes an outlet port 124 that extends through the housing 112 and is fluidically coupled with the working fluid chamber 118. The outlet port 124 is configured to remove working fluid from the working fluid chamber 118. Specifically, when the reservoir 110 is a supply reservoir 148, as shown in FIG. 2A, the inlet port 122 fluidically couples the supply working fluid chamber 118*a* to a return working fluid chamber 118*b*, via a supply-return line 174. The outlet port 124 fluidically couples the supply working fluid chamber 118*a* to the fluid management device 102, via the inlet line 106. Likewise, when the reservoir 110 is a return reservoir 150, as shown in FIG. 2B, the inlet port 122 fluidically couples the return working fluid chamber 118*b* to a fluid management device 102, via an outlet line 108. The outlet port 124 fluidically couples the return working fluid chamber 118*b* to the supply working fluid chamber 118*a*, via the supply-return line 174.

The reservoir 110 also includes a bleed channel 128 extending a length L along an outer periphery 119 of the working fluid chamber 118. The bleed channel 128 is fluidically open to the working fluid chamber 118 along the length L of the bleed channel 128. A bleed port 126 fluidically couples with only a portion of the bleed channel 128. The bleed port 126 is configured to bleed gas out of the working fluid chamber 118 via the bleed channel 128. Bleeding gas from the working fluid chamber 118 helps to maintain the pressure of the portion of working fluid within the working fluid chamber 118. In other words, gas within the working fluid chamber 118 can negatively affect pressure regulation and working fluid flow through the fluid circulation system and therefore should be removed from the working fluid chamber 118. Gas may unintentionally enter into the working fluid chamber 118 in various ways, such as leaky connections in the reservoir 110 or air pulled into a nozzle of the fluid management device during use, etc. Gas will naturally move to an uppermost portion 181 of the working fluid chamber 118. However, because the reservoir 110 is rotatable, the uppermost portion 181 of the working fluid chamber 118 will change as the reservoir 110 is rotated or changes orientation. Therefore, the bleed channel 128 is configured to allow at least a portion of the length L of the bleed channel 128 to be open to the uppermost portion 181 of the working fluid chamber 118 regardless of the orientation of the reservoir 110 or at least within some angular range of the of the reservoir 110.

In the supply reservoir 148, shown in FIG. 2A, the bleed port 126 a separate port from the inlet port 122 and the outlet port 124. The bleed port 126 is fluidically coupled with the bulk reservoir 146, such that gas, as well as, working fluid can be bled through the bleed port 126 into the bulk reservoir 146. In the return reservoir 150, shown in FIG. 2B, the bleed port 126 and the outlet port 124 are the same port (bleed-outlet port). That is, the port that removes the portion of working fluid from the working fluid chamber 118 to the supply reservoir 148, via the supply-return line 174, is also used to bleed gas from the working fluid chamber 118. Accordingly, the bleed port 126 and the outlet port 124 are one port configured to remove both gas and a portion of working fluid from the working fluid chamber 118. Moreover, the return reservoir 150 also includes a bulk port 144 that extends through the housing 112 and is fluidically coupled with the working fluid chamber 118. The bulk port 144 is configured to provide working fluid from the bulk reservoir 146 to the return reservoir 150, via the return-bulk line 168.

In some examples, the housing 112 is rotatable within an angular range between 0 and 90 degrees and the length L of the bleed channel 128 spans no less then twenty-five percent of the outer periphery 119 of the working fluid chamber 118. Accordingly, as the housing 112 rotates between 0 and 90 degrees, at least a portion of the bleed channel 128 is open to the uppermost portion 181 of the working fluid chamber 118. Gas that accumulates at the uppermost portion 181 of the working fluid chamber 118 can therefore be bleed out of the bleed channel 128 and through the bleed port 126. The bleed port 126 removes the gas to the bulk reservoir 146 fluidically coupled to the bleed port 126, via a supply-bleed line 170 or a return-bleed line 172, depending on the type of reservoir 110. In other examples, the housing 112 is rotatable within an angular range of between 0 and 180 degrees and the length L of the bleed channel 128 spans no less than fifty percent of the outer periphery 119 of the working fluid chamber 118. In yet other examples, the housing 112 is rotatable within an angular range between 0 and 270 degrees and the length L of the bleed channel 128 spans no less than seventy-five percent of the outer periphery 119 of the working fluid chamber 118. Additionally, in other examples, the housing 112 is rotatable within an angular range between 0 and 360 degrees and the length L of the bleed channel 128 spans along the entirety of the outer periphery 119 of the working fluid chamber 118.

Figure 3A:
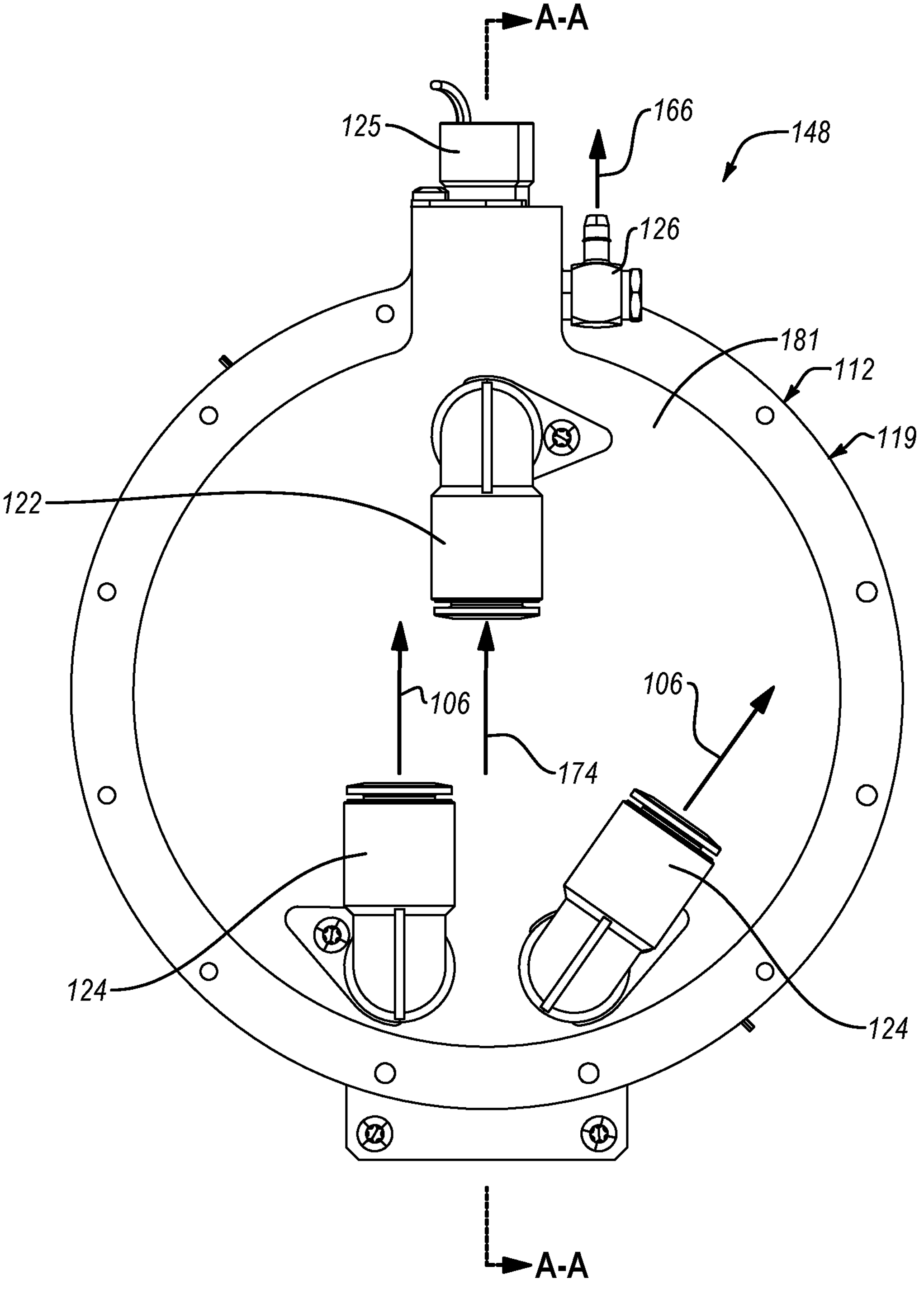
FIG. 3A is a schematic perspective view of a fluid reservoir of a fluid circulation system, according to one or more examples of the present disclosure.
Figure 3B:
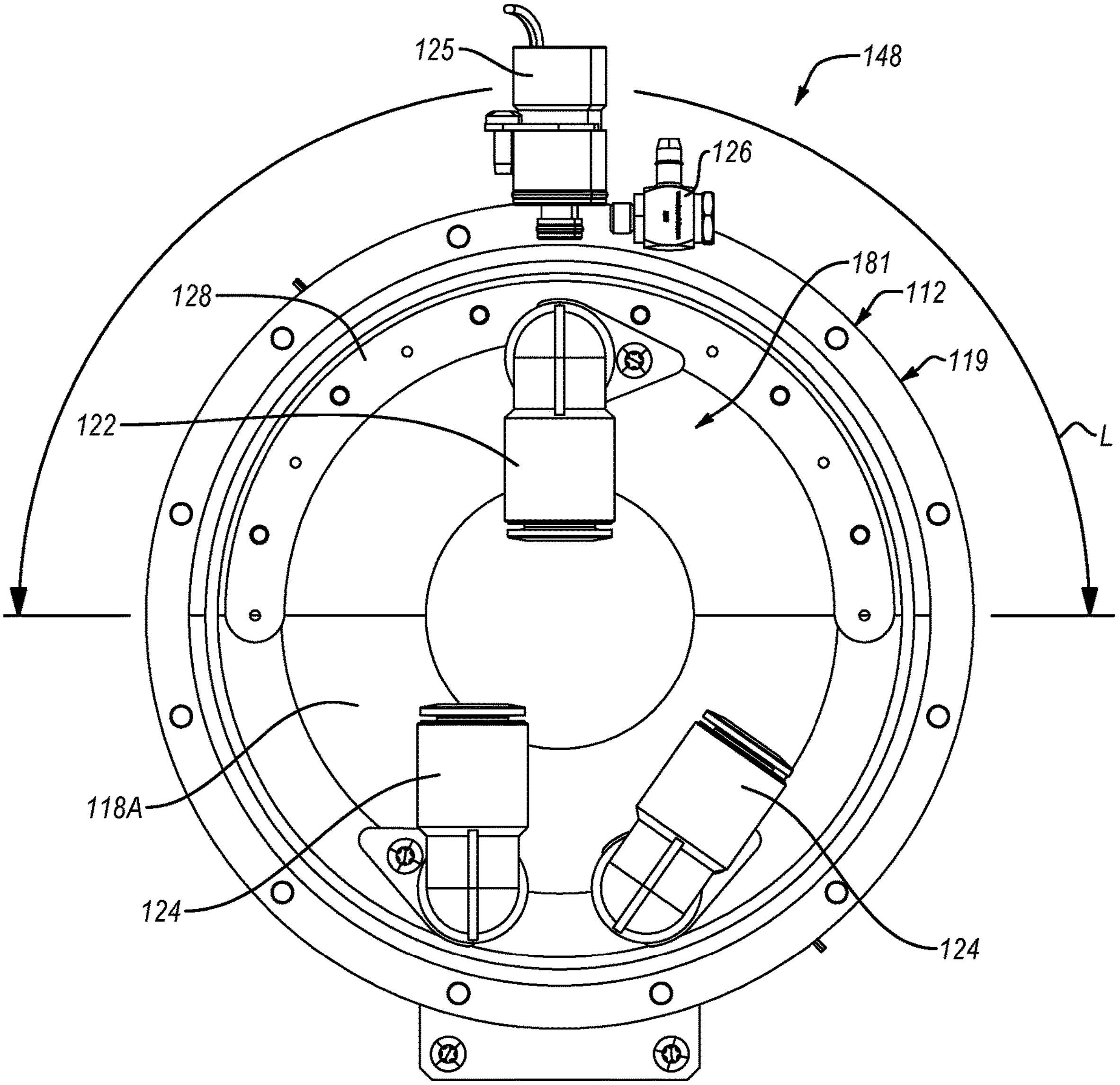
FIG. 3B is a schematic perspective view of the fluid reservoir of FIG. 3A, with an upper cover removed and a bleed channel visible, according to one or more examples of the present disclosure.
Figure 3C:
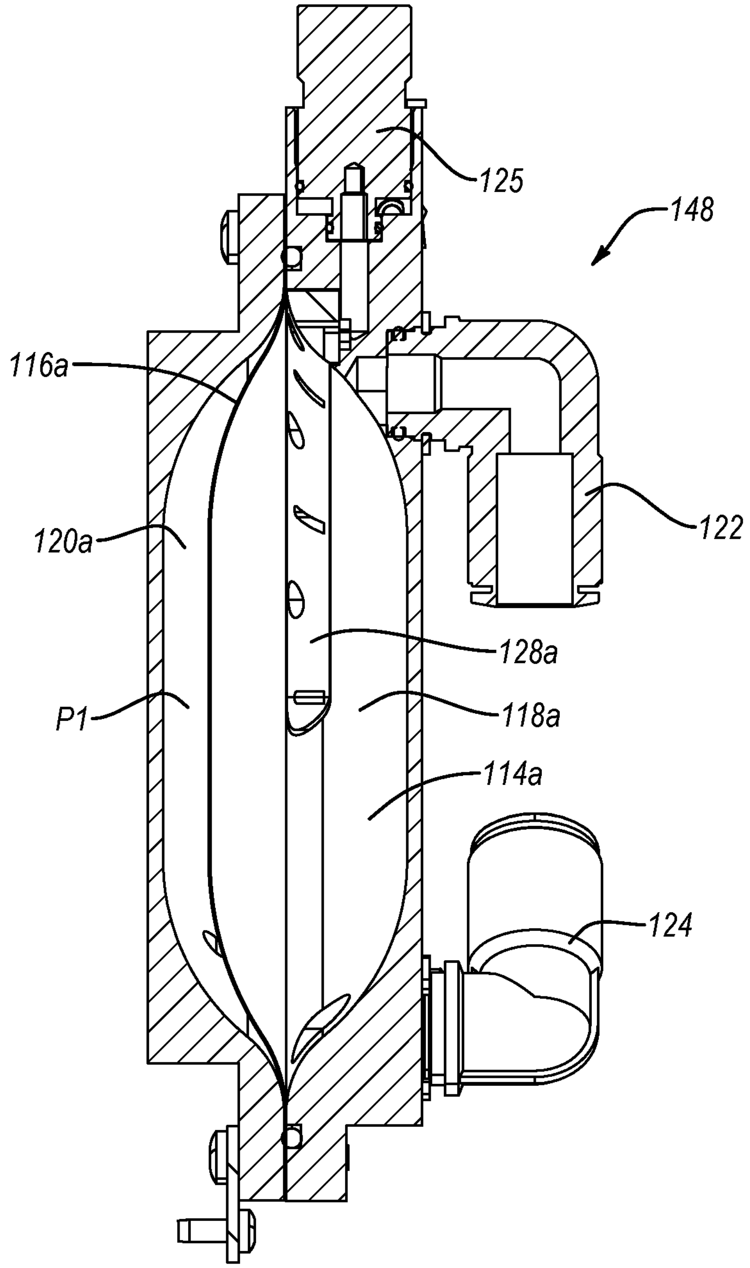
FIG. 3C is a schematic cross-sectional side view of the fluid reservoir of FIG. 3A, taken along line A-A of FIG. 3A, according to one or more examples of the present disclosure.

Referring to FIGS. 3A-3C, one example of the supply reservoir 148 is shown. In some examples, the outer periphery 119 of the supply working fluid chamber 118*a* has a circular shape. The circular shape of the outer periphery 119 is just one illustrative example of a shape the outer periphery 119. In other examples, the shape of the outer periphery 119 can be oval, rectangular, polygonal, etc. In the illustrated example of FIG. 3B, the bleed channel 128 curves in an arcuate shape along the circular shape of the outer periphery 119 of the supply working fluid chamber 118*a*. That is, the bleed channel 128 is adjacent to a peripheral edge of the supply working fluid chamber 118*a*, such that the bleed channel 128 is in contact with the uppermost portion 181 of the supply working fluid chamber 118*a* when the housing 112 is in any one of the various rotational orientations. Moreover, a radius of curvature of the arcuate shape is equal to a radius of curvature of the circular shape. Accordingly, as the housing 112 is rotated, the bleed channel 128 stays in contact with the uppermost portion 181 of the working fluid chamber 118. In some examples, as described above, the housing 112 may be limited in rotation, such that the housing 112 can only rotate from a neutral position (i.e., 0 degrees) to specified rotational position (i.e., +/−a specified degree). Therefore, the bleed channel 128 may only extend in the arcuate shape along the portion of the supply working fluid chamber 118*a* to ensure that the bleed channel 128 is in contact with the uppermost portion 181 of the working fluid chamber while the housing 112 rotates between the neutral position and the specified rotational position. In examples where the supply working fluid chamber 118*a* adopts a different shape, the bleed channel 128 is configured to align with a contour of the outer periphery 119 of the working fluid chamber 118. This alignment ensures that the bleed channel 128 remains in contact with the uppermost portion 181 of the working fluid chamber 118 regardless of the specific rotational orientation of the housing 112.

As shown in FIG. 3A, the supply reservoir 148 includes the inlet port 122 which is configured to be connected to the supply-return line 174, and supply working fluid into the supply working fluid chamber 118*a* from the return reservoir. The supply reservoir 148 includes at least one outlet port 124, configured to be connected to a corresponding inlet line 106 and supply working fluid to the fluid management device. When the supply reservoir 148 is supplying working fluid to more than one fluid management device, the supply reservoir 148 will have more than one outlet port 124, such as the two outlet ports 124 shown. Additionally, the supply reservoir 148 includes the bleed port 126, which is configured to bleed gas and working fluid from the supply reservoir 148 to the bulk reservoir via the supply-bulk line 166. In some examples, a proportional valve 125 may be coupled to the bleed port 126, enabling precise regulation of working fluid and gas flow out of the supply working fluid chamber. The proportional valve 125 may also be used to precisely modulate the working fluid pressure at the bleed port 126.

As shown in FIG. 3B, an upper cover of the housing 112 has been removed to allow the interior of the supply working fluid chamber 118*a* to be visible. Accordingly, the bleed channel 128 is shown, coupled to the bleed port 126. Accordingly, working fluid enters into the supply working fluid chamber 118*a* via the inlet port 122 and is removed from the supply working fluid chamber via the outlet port 124. Additionally, gas, as well as, some working fluid is removed from the supply working fluid chamber 118*a* via the bleed channel 128 and bleed port 126.

Figure 4:
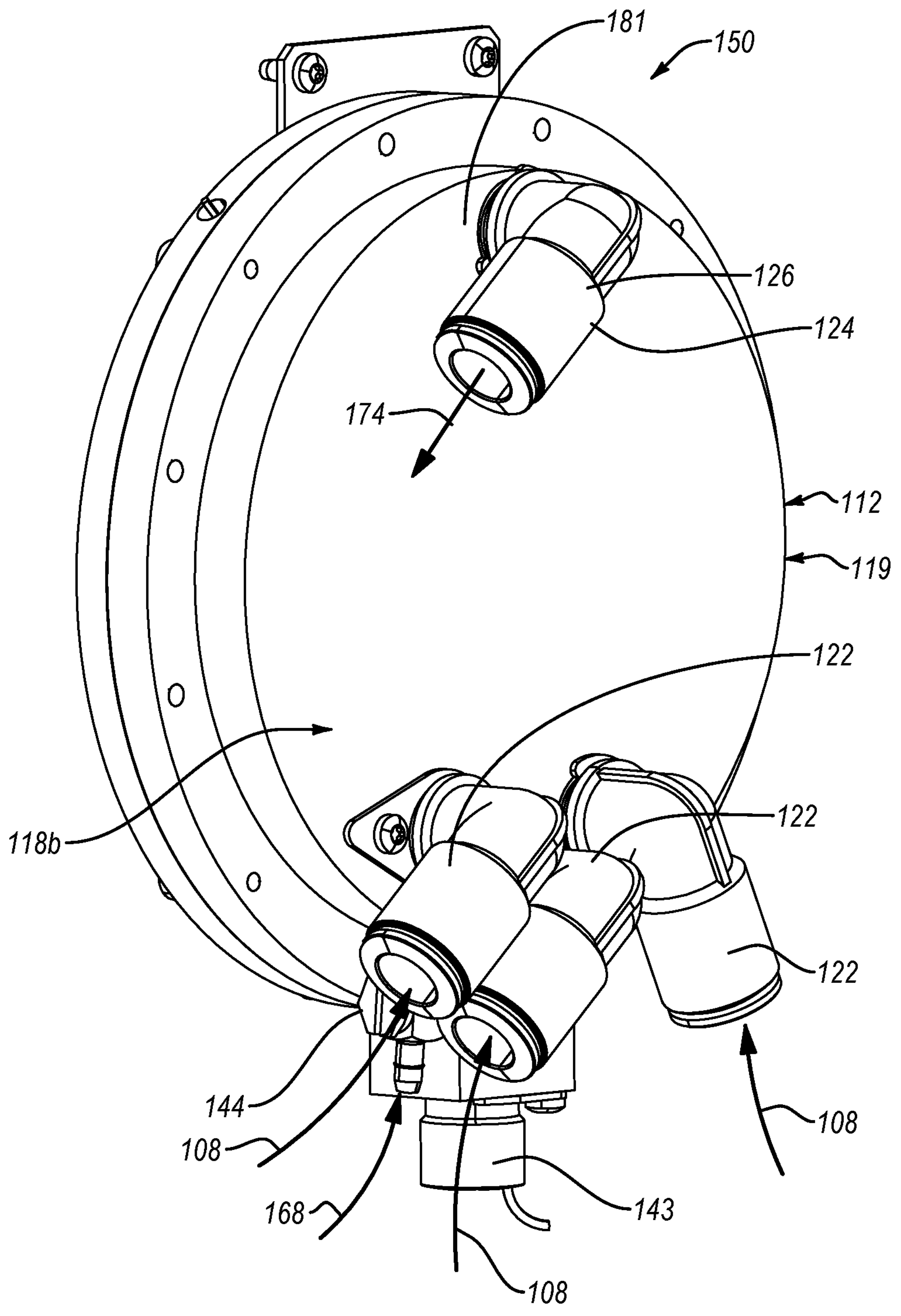
FIG. 4 is a schematic perspective view of another fluid reservoir of a fluid circulation system, according to one or more examples of the present disclosure.

Referring to FIG. 4, one example of the return reservoir 150 is shown. The housing 112 of the return reservoir 150 may have the same size and shape as the supply reservoir 148, as described above in reference to FIG. 3A. Alternatively, the return reservoir 150 may have a different size and/or shape from the supply reservoir 148, such as a larger or smaller housing circumference.

The return reservoir 150 includes at least one inlet port 122 which is configured to be connected to the outlet line 108 and return working fluid from the fluid management device. When the return reservoir 150 is returning working fluid from more than one fluid management devices, the return reservoir 150 will have a corresponding number of inlet ports 122, such as the three inlet ports 122 shown. The return reservoir 150 also includes the bulk port 144 configured to supply working fluid from the bulk reservoir to the return working fluid chamber 118*b* via the bulk-return line 168. In some examples, a proportional valve 143 may be coupled to the bulk port 144, enabling the precise regulation and modulation of the working fluid entering into the return working fluid chamber 118*b*. Additionally, the return reservoir 150 includes a port that functions as both the bleed port 126 and the outlet port 124 (bleed-outlet port). The bleed-outlet port is configured to bleed gas and working fluid from the return reservoir 150 to the supply reservoir 148 via the supply-return line 174. Although not shown, the return reservoir 150 includes a bleed channel 128 coupled with the bleed port 126, similar to the bleed channel 128 shown in FIG. 3B.

Figure 5A:
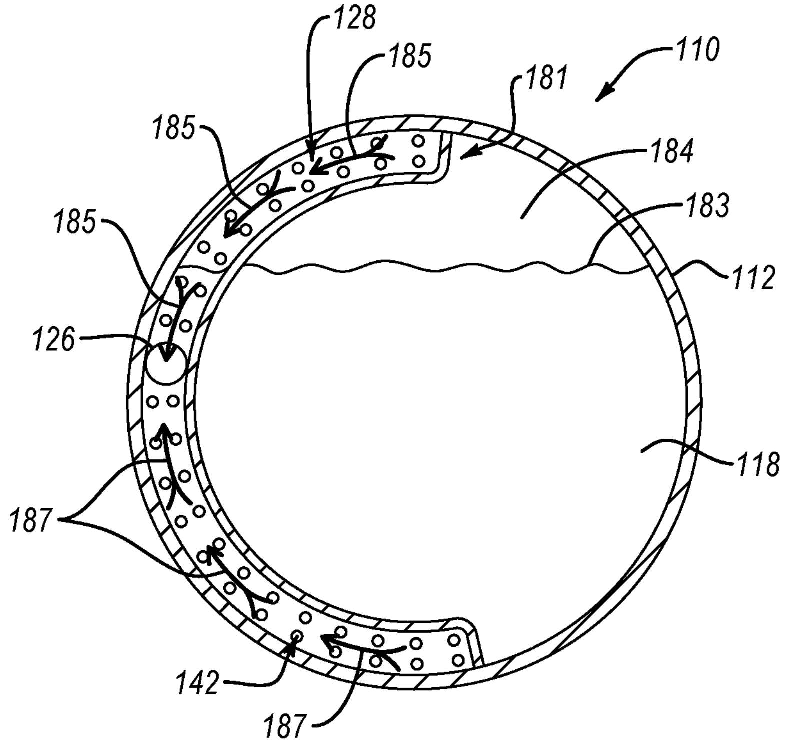
FIG. 5A is a schematic cross-sectional front view of a fluid reservoir of a fluid circulation system, similar to the view shown in FIG. 3B without additional ports shown, according to one or more examples of the present disclosure.

As shown in FIG. 5A, the bleed channel 128 of either the supply reservoir 148 or the return reservoir 150 includes a plurality of orifices 142 along the length of the bleed channel 128. The plurality of orifices 142 are fluidically open to the working fluid chamber 118. The plurality of orifices 142 are sized such that gas 184 in the portion of working fluid 183 is readily bled, as bled gas 185, from the working fluid chamber 118 into the bleed channel 128 and then into the bleed port 126, and the working fluid 183 is less readily bled, as fled fluid 187, from the working fluid chamber 118 into the bleed channel 128 and then into the bleed port 126. Accordingly, more gas 184 will be drawn from the working fluid chamber 118 via the bleed channel 128 than working fluid 183.

Figure 5B:
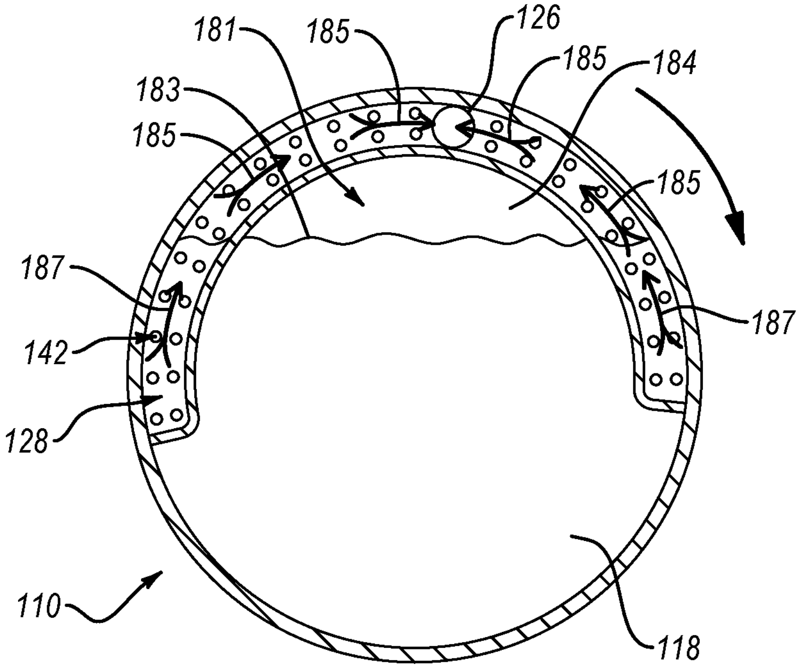
FIG. 5B is a schematic cross-sectional front view of the fluid reservoir of FIG. 5A, shown in a different rotational orientation, according to one or more examples of the present disclosure.

FIG. 5B shows the reservoir 110 rotated 90-degrees to the right. In this new orientation, the bleed channel 128 remains open to the newly defined uppermost portion 181 of the working fluid chamber 118 and in position to draw the gas 184 through the orifices 142 and into the bleed channel 128.

Figure 6:
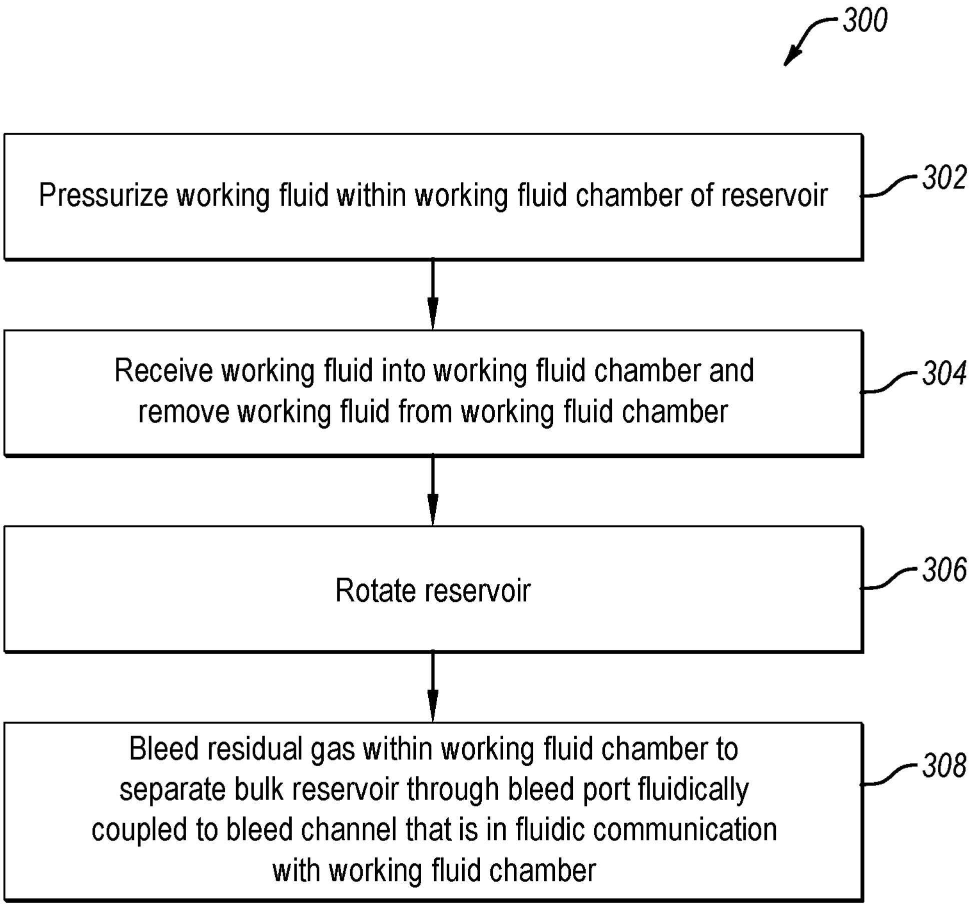
FIG. 6 is a schematic flow diagram of a method of removing gas from working fluid within a reservoir, according to one or more examples of the present disclosure.

Referring to FIG. 6, according to some examples, a method 300 for removing gas from working fluid within a reservoir is shown. The method 300 includes (block 302) pressurizing a portion of working fluid within a working fluid chamber 118 of a reservoir 110 by pressurizing a pressurized gas within a gas chamber 120 of the reservoir 110 at a constant pressure. The working fluid chamber 118 and the gas chamber 120 are separated by a membrane 116. The method 300 also includes (block 304) receiving a portion of working fluid into the working fluid chamber 118 and removing a portion of working fluid from the working fluid chamber 118. The method 300 further includes (block 306) selectively rotating the reservoir 110, relative to a bulk reservoir 146. The bulk reservoir 146 is in fluidic communication with the working fluid chamber 118 of the reservoir 110. When the reservoir 110 is selectively rotating, the method 300 additionally includes (block 308) bleeding gas within the working fluid chamber 118 to the bulk reservoir 146, through a bleed port 126 fluidically coupled to a bleed channel 128 that is in fluidic communication with the working fluid chamber 118 of the reservoir 110. The method 300 can further include maintaining the pressurized gas within the gas chamber 120 of the reservoir 110 at a constant pressure using a pressure valve 158 and a vacuum 160.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A reservoir of a fluid circulation system, the reservoir comprising:

a housing defining an interior chamber and being selectively rotatable into any one of various rotational orientations;

a membrane positioned within the housing and separating the interior chamber into a working fluid chamber, containing a portion of working fluid, and a gas chamber, containing a pressurized gas and configured to maintain the portion of working fluid in the working fluid chamber at a constant pressure;

an inlet port fluidically coupled with the working fluid chamber and configured to provide working fluid into the working fluid chamber;

an outlet port fluidically coupled with the working fluid chamber and configured to remove working fluid from the working fluid chamber;

a bleed channel extending a length along an outer periphery of the working fluid chamber and fluidically open to the working fluid chamber along the length of the bleed channel; and a bleed port fluidically coupled with only a portion of the bleed channel and configured to bleed gas out of the working fluid chamber via the bleed channel;

wherein the length of the bleed channel is such that at least a portion of the bleed channel is open to an uppermost portion of the working fluid chamber when the housing is in any one of the various rotational orientations.

2. The reservoir of claim 1, wherein the membrane is configured to be maintained under tension between the working fluid chamber and the gas chamber.

3. The reservoir of claim 1, wherein:

the housing is rotatable within an angular range between 0 and 90 degrees; and the length of the bleed channel spans no less than twenty-five percent of the outer periphery of the working fluid chamber.

4. The reservoir of claim 1, wherein:

the housing is rotatable within an angular range between 0 and 180 degrees; and the length of the bleed channel spans no less than fifty percent of the outer periphery of the working fluid chamber.

5. The reservoir of claim 1, wherein:

the housing is rotatable within an angular range between 0 and 270 degrees; and the length of the bleed channel spans no less than seventy-five percent of the outer periphery of the working fluid chamber.

6. The reservoir of claim 1, wherein:

the housing is rotatable within an angular range between 0 and 360 degrees; and the length of the bleed channel spans along an entirety of the outer periphery of the working fluid chamber.

7. The reservoir of claim 1, wherein:

the outer periphery of the working fluid chamber has a circular shape;

the bleed channel curves in an arcuate shape along the outer periphery of the working fluid chamber; and a radius of curvature of the arcuate shape is equal to a radius of curvature of the circular shape.

8. The reservoir of claim 1, wherein the bleed channel comprises a plurality of orifices along the length of the bleed channel, wherein only the plurality of orifices are fluidically open to the working fluid chamber, and wherein the plurality of orifices are sized such that gas is readily bled from the working fluid chamber and working fluid is less readily bleed from the working fluid chamber.

9. The reservoir of claim 1, further comprising a bulk port fluidically coupled with the working fluid chamber and configured to provide working fluid from a bulk reservoir into the working fluid chamber.

10. The reservoir of claim 1, wherein working fluid comprises ink.

11. A fluid circulation system for supplying working fluid to and returning working fluid from a fluid management device, the fluid circulation system comprising:

a supply reservoir comprising a supply membrane separating a supply working fluid chamber, containing a portion of working fluid, and a supply gas chamber, containing a pressurized gas at a first pressure, wherein the supply reservoir further comprises a supply-bleed port and a supply-bleed channel, the supply-bleed port being fluidically coupled with only a portion of the supply-bleed channel, which is in fluidic communication with the supply working fluid chamber, and further comprises a supply inlet port and a supply outlet port fluidically coupled with the supply working fluid chamber and configured to provide and remove working fluid into and from the supply working fluid chamber, respectively, wherein the supply-bleed channel extends a length along an outer periphery of the supply working fluid chamber and is fluidically open to the supply working fluid chamber along the length of the supply-bleed channel, and wherein the supply-bleed port is configured to bleed gas out of the supply working fluid chamber via the supply-bleed channel;

a return reservoir comprising a return membrane separating a return working fluid chamber, containing a portion of working fluid, and a return gas chamber, containing a pressurized gas at a second pressure, wherein the return reservoir further comprises a return-bleed port and a return-bleed channel, the return-bleed port being fluidically coupled with only a portion of the return-bleed channel, which is in fluidic communication with the return working fluid chamber, and further comprises a return inlet port and a return outlet port fluidically coupled with the return working fluid chamber and configured to provide and remove working fluid into and from the return working fluid chamber, respectively, wherein the return-bleed channel extends a length along an outer periphery of the return working fluid chamber and is fluidically open to the return working fluid chamber along the length of the return-bleed channel, and wherein the return-bleed port is configured to bleed gas out of the return working fluid chamber via the return-bleed channel; and a bulk reservoir comprising a bulk working fluid chamber with a free surface;

wherein:

the supply-bleed channel is configured to bleed gas within the supply working fluid chamber to the bulk reservoir;

the return-bleed channel is configured to bleed gas within the return working fluid chamber indirectly to the bulk reservoir, via the supply working fluid chamber;

the supply reservoir and the return reservoir are independently and selectively rotatable into any one of various rotational orientations, relative to the bulk reservoir;

the supply reservoir is configured to receive a portion of working fluid to the supply working fluid chamber from the return working fluid chamber and further configured to supply a portion of working fluid from the supply working fluid chamber to the fluid management device;

the return reservoir is configured to receive a portion of working fluid from the fluid management device into the return working fluid chamber and further configured to supply a portion of working fluid from the return working fluid chamber to the supply working fluid chamber;

the length of the supply-bleed channel is such that at least a portion of the supply-bleed channel is open to an uppermost portion of the supply working fluid chamber when the supply reservoir is in any one of the various rotational orientations; and the length of the return-bleed channel is such that at least a portion of the return-bleed channel is open to an uppermost portion of the return working fluid chamber when the return reservoir is in any one of the various rotational orientations.

12. The fluid circulation system of claim 11, wherein the bulk reservoir is further configured to provide or remove a portion of working fluid to at least one of the supply working fluid chamber or the return working fluid chamber.

13. The fluid circulation system of claim 11, further comprising a pump between the return reservoir and the supply reservoir and configured to pump the portion of working fluid from the return working fluid chamber to the supply working fluid chamber.

14. The fluid circulation system of claim 11, wherein:

the first pressure of the pressurized gas within the supply gas chamber has a pressure different from the second pressure of the pressurized gas within the return gas chamber; and the first pressure is higher than the second pressure.

15. The fluid circulation system of claim 11, further comprising:

a first pressure valve and a first vacuum; and a second pressure valve and a second vacuum;

wherein:

the first pressure of the pressurized gas within the supply gas chamber is maintained at a constant pressure by the first pressure valve and the first vacuum coupled to the supply reservoir; and the second pressure of the pressurized gas within the return gas chamber is maintained at a constant pressure by the second pressure valve and the second vacuum coupled to the return reservoir.

16. The fluid circulation system of claim 11, wherein the supply reservoir and the return reservoir have unlimited volume compliance, such that a pressure of the portion of working fluid within the supply working fluid chamber and the pressure of the port of working fluid within the return working fluid chamber, respectively, remains constant irrespective of variations in a volume of the portion of working fluid.

17. The fluid circulation system of claim 11, wherein each one of the supply reservoir and the return reservoir are independently and rotatably mounted to a six-axis mount.

* * * * *